Oct. 4, 1955     C. R. STONE     2,719,536
CROSS-FLOW PREVENTION DEVICE
Filed June 16, 1951
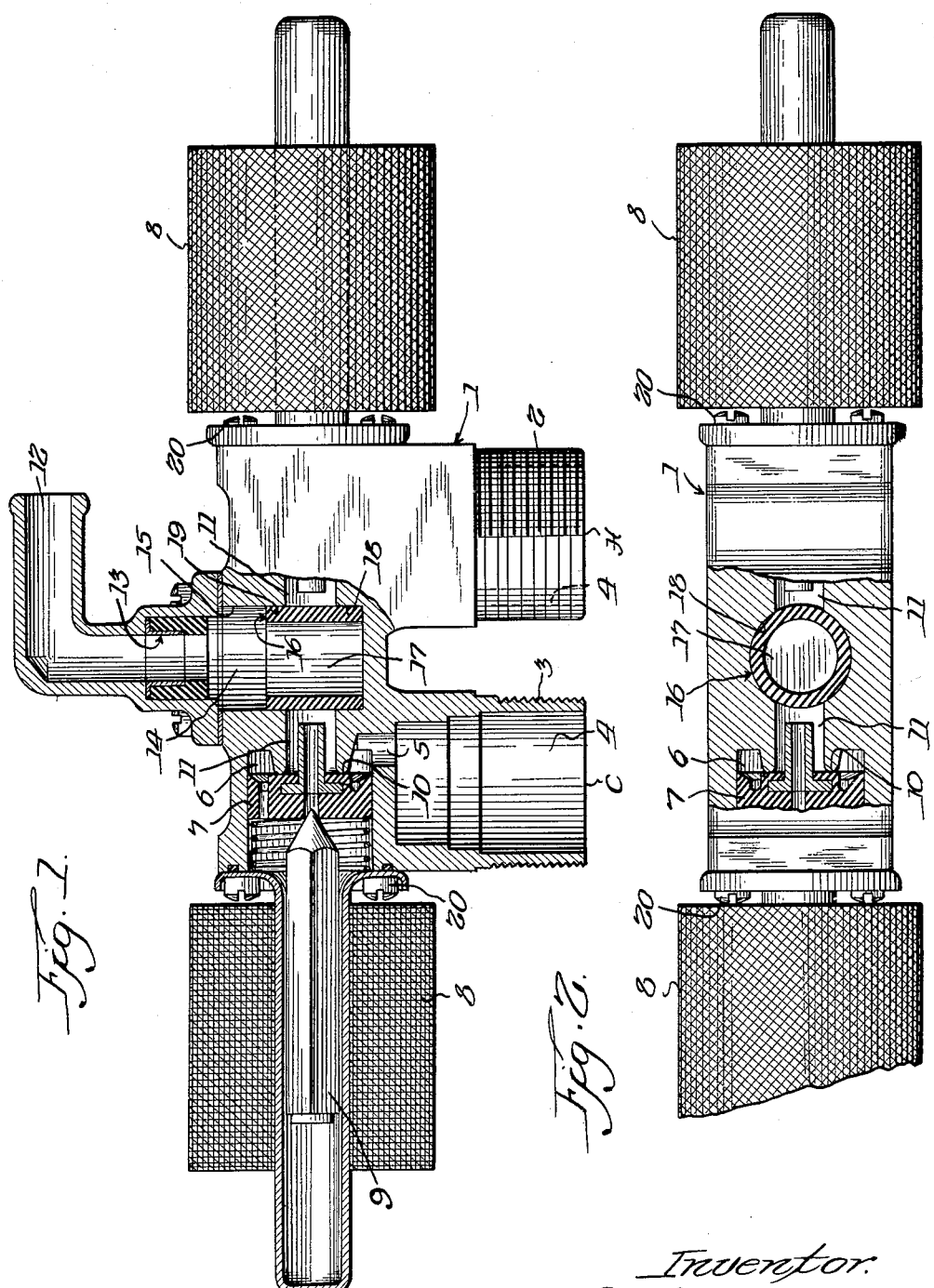
Inventor.
Carl R. Stone.
By Joseph O. Lange
Atty.

United States Patent Office 2,719,536
Patented Oct. 4, 1955

2,719,536

CROSS-FLOW PREVENTION DEVICE

Carl R. Stone, Lombard, Ill., assignor to Crane Co., Chicago, Ill., a corporation of Illinois Application June 16, 1951, Serial No. 232,033

2 Claims. (Cl. 137—111)

This invention relates to a cross-flow prevention device and, more particularly, it is concerned with a novel form of economical check valve useful in any mixing valve having cold and hot water inlets, for example, and mixing within a chamber and then discharged therefrom.

In order to appreciate the background of this invention, it should be realized that one of the important objectives in valves, such as mixing valves, for example, is to prevent cross flow between the respective hot and cold water inlets. Heretofore, this has been done by means of check valves having movable closure members which, however, are either relatively expensive or else frequently are subject to operational difficulties, because of interference by line accumulations, such as foreign matter, calcium carbonate, or the like.

It should, of course, be understood, too, that there are many plumbing codes throughout the country forbidding the installation of the device in which a cross connection can be effected between the hot and cold water supply sources or inlets.

Therefore, it is one of the more important objects of this invention to provide for a valve in which such objectionable cross connections are positively avoided and which also provides a construction in which the tendency for such accumulations or deposits of foreign matter to interfere with proper operation of the valve is substantially minimized.

More particularly, this invention has for its object the provision for a backflow preventer effective and easily installable in such valves, for example, as those for automatic washing machines, such as covered in U. S. Patent #2,548,516, issued April 10, 1951.

Another provision is to provide for a cross-flow check valve of generally sleeve or even solid form and preferably resiliently deformable so as to be cheaply installed and relatively easy to manufacture.

Other objects and advantages will become more readily apparent upon proceeding with the following specification read in light of the accompanying drawings, in which Fig. 1 is an assembly view in exterior and fragmentary sectional assembly view of a mixing device embodying my invention.

Fig. 2 is a fragmentary plan sectional view of the device shown in Fig. 1.

Similar reference numerals refer to similar parts throughout the several views.

Referring now to Fig. 1, the valve body or casing, generally designated 1, is preferably provided with the respective inlets H and C, serving as the connecting means to respective hot and cold water supply lines, and having the desired means for effecting such supply connection as the respective threads 2 and 3. Obviously, other suitable connecting means may be substituted for the same threads. The respective hot and cold water inlets H and C are provided with the inlet chambers 4, each of which communicates with its respective opening 5 leading to a chamber 6 within which a suitable closure member, such as 7, is positioned. The latter closure member may, of course, be actuated in any number of different ways aside from the manner illustrated, as, for example, in the instant illustration, a solenoid 8 is used in each case for effecting the reciprocal movement of the stem 9, which in turn allows for the disc or closure member 7 to be lifted from its seat. The solenoid mechanisms are suitably attached to the casing 1 by means of the screw 20. It will, thus, be apparent that upon the occurrence of such opening movement of the main valve closure members 7, the desired amount of incoming hot and cold water from H and C respectively will be permitted to enter the downstream chamber or passage 11 beyond the disc 7, the latter member normally seating at 10. The inlet passage 11 in each case communicates with the chamber 6 upon the said occurrence of opening movement of the closure member. As shown, each of the inlet passages is substantially oppositely disposed to the other, thereby to converge at the main valve chamber 14 and communicate predeterminately with the outlet 12.

In the particular example illustrated, the solenoid actuating mechanism is connected with a suitable timer (not shown) which permits predetermined actuation of the solenoid thereby to allow the desired amount of hot and cold water to enter the valve. However, since this is not a part of this invention, no further explanation need be given.

The respective hot and cold water inlets H and C, being connected to independent sources of supply in order to provide for the desired mixture within the valve are also operable in response to a condition within the valve, whereby at the outlet end thereof, such as at 12, it is usually connected to a washing machine chamber or other use. Here, there is positioned in the outlet, such as the element generally designated 13, a flow control device which insures uniform flow rate regardless of the pressure variation of the mixture within the valve. The flow control element in the outlet is preferably of the type shown in patent application, Serial No. 228,584, filed May 28, 1951, whereby as flow pressure increases, fluid back pressure is actually built up in the main valve chamber 14. Normally, this condition would cause objectionable cross flow of the hot and cold water, into either line supply if no check device were used. As previously indicated, in the past, expensive forms of check valves have been devised to prevent such backflow and cross connection, but for the reasons stated, they have not been entirely acceptable. The main valve chamber 14 thus communicates normally with the oppositely disposed or side inlet openings 11 containing respectively hot or cold water. It has been found that if the annular surface 15 of the chamber 14 is preferably made of relatively smooth cylindrical form, it affords an effective and relatively economical seat for the cross flow preventer member, generally designated 16, which may be made solid or of tubular form thereby to have an inner chamber 17. Thus, it may easily be made from a short length of ordinary rubber hose of such length, however, as to provide the overlapping annular end portions, as at 18 and 19, around the chamber and the inlet bores 11 of the body. Obviously, the amount of such overlap is a matter of individual selection, depending upon the nature of pressure conditions encountered and the character of the fluid being handled. For example, in some cases, tests were made with a ⅝-inch length of hose having an overlap of ⅛-inch over the inlet portion 11 of the body, and it was determined that the length was too great because the tubing was forced against the outlet nozzle by the water pressure and thus choked off or restricted the discharge flow therefrom.

In contradistinction, a repeat test was then made with a shorter length of tubing having an overlap of only 1/16-inch around the ports 11, and such construction was found to be tight under eighty pounds pressure per square inch.

The matter of degree of deformability in response to pressure will, of course, be a factor in determining the proper size and the tolerance of dimensions controlling the tubular member, such as a piece of hose deforming and opening at the lower pressures and yet remaining fluid tight on relatively high pressures.

In actual operation, it will now be apparent that should it be found that there is an unbalanced pressure condition within the chamber 14 in that the pressure in the hot water inlet, for example, exceeds the pressure in the cold water inlet, then the resultant cross flow into the cold water line due to such unbalanced pressure condition, will be prevented by the plugging of the respective inlet having the lesser pressure within the chamber 17 due to the response of the deformable cross flow preventer 16, which may be solid rather than tubular, although the latter form is preferred. It has also been found that by virtue of such deformability of the material comprising the cross-flow preventer 16, any tendencies for lime and other deposits in a water line to normally accumulate on the valve seat are broken up by such distortion or deformation of the material, as, for example, at the annular seating or bearing surfaces at 18 and 19. It has also been found beneficial in providing for such cross-flow preventer that the length of the tubing may be economically and easily cut to the desired size to permit the proper overlap without expensive modification in the valve itself being necessary. It will, of course, be appreciated that the embodiment as shown and as above described is adaptable for uses on devices other than washing machine valves or mixing valves, and therefore, it is not the intention to limit the invention to the particular form of valve application illustrated. The invention as set forth in the following claims may embody a plurality of forms and adaptations.

I claim:

1. A cross-flow prevention device, a multi-ported body having a plurality of inlets and an outlet therefrom, a chamber within the said body having a blank end and an opposite open end communicating with the outlet of said body, the outer periphery of said chamber being continuous except for that portion interrupted by openings communicating with said inlets, a deformable tubular member snugly receivable within said chamber and peripherally continuously contacting the walls of the said chamber except for the said inlet openings and the end thereof communicating with the body outlet, the said tubular member under the influence of predetermined fluid pressure from the said inlets being relieved from contact with said chamber walls to permit fluid flow past the relieved portion of the said tubular member to the outlet, a resilient flow-restricting tubular member fitted within a cylindrical chamber in the said body outlet in proximity to the fluid discharge past the said deformable tubular member, the said flow restricting member having an inner deformable end portion impinged by said fluid flow past a deflected portion of the said tubular member.

2. A cross-flow preventer of the character described, the combination of a body having a plurality of ported inlets substantially converging to communicate predeterminately with an outlet therefrom, a substantially cylindrical chamber in the body between the converging ported inlets and communicating at an open end thereof with the said outlet, a snugly fitted deformable hollow cylindrical member covering the peripheral wall of the said body chamber except that peripheral portion communicating with the outlet, the said hollow cylindrical member being resilient and normally closing the ports of said inlets upon the cessation of fluid flow therefrom, the said hollow member being deformably responsive to permit outer annular surface displacement inwardly upon occurrence of fluid flow to permit fluid flow from the respective inlet ports past the displaced portions of the hollow cylindrical member to the said outlet, and flow regulating means of hollow cylindrical form communicating with the said outlet and chamber to maintain relatively constant rate of flow regardless of pressure variations within the chamber and the hollow portion of the cylindrical member, the said flow regulating means being positioned in spaced apart relation to the open end of the said cylindrical member communicating with the said outlet, the said flow regulating means being resiliently deformable and having an inner annular end surface substantially in the path of annular fluid flow past the hollow cylindrical member upon the occurrence of said surface displacement of the latter member.

References Cited in the file of this patent

UNITED STATES PATENTS

| Number | Name | Date |
|---|---|---|
| 529,432 | Pelt | Nov. 20, 1894 |
| 894,286 | Reineking | July 26, 1908 |
| 1,860,163 | Wyzenbeek | May 24, 1932 |
| 1,888,758 | Costello | Nov. 22, 1932 |
| 2,449,573 | White | Sept. 21, 1948 |

FOREIGN PATENTS

| Number | Country | Date |
|---|---|---|
| 23,990 | Austria | of 1909 |
| 372,286 | Great Britain | of 1932 |
| 525,481 | France | of 1921 |
| 596,081 | France | of 1925 |